(12) United States Patent
Redecker

(10) Patent No.: US 7,677,500 B2
(45) Date of Patent: Mar. 16, 2010

(54) AIRCRAFT STRUCTURAL ELEMENT PROVIDED WITH A CAVITY AND DRAINAGE ELEMENT

(75) Inventor: Robert Redecker, Hamburg (DE)

(73) Assignee: Airbus Deutschland, Hamburg, DE (US)

( * ) Notice: Subject to any disclaimer, the term of this patent is extended or adjusted under 35 U.S.C. 154(b) by 0 days.

(21) Appl. No.: 11/817,885

(22) PCT Filed: Mar. 10, 2006

(86) PCT No.: PCT/EP2006/060620

§ 371 (c)(1),
(2), (4) Date: May 28, 2008

(87) PCT Pub. No.: WO2006/095018

PCT Pub. Date: Sep. 14, 2006

(65) Prior Publication Data

US 2009/0014588 A1    Jan. 15, 2009

(30) Foreign Application Priority Data

Mar. 10, 2005    (DE) .................. 10 2005 011 531

(51) Int. Cl.
*B64D 1/00*    (2006.01)

(52) U.S. Cl. .................................... 244/136

(58) Field of Classification Search ............ 244/136, 244/53 B; 411/399, 403, 395; 285/247, 285/251

See application file for complete search history.

(56) References Cited

U.S. PATENT DOCUMENTS

| | | | | |
|---|---|---|---|---|
| 3,044,584 A | * | 7/1962 | Thompson | 403/408.1 |
| 3,494,243 A | * | 2/1970 | Kleinhenn | 411/403 |
| 4,463,774 A | * | 8/1984 | Gorges et al. | 137/81.1 |
| 5,622,393 A | * | 4/1997 | Elbich et al. | 285/245 |
| 2004/0245776 A1 | * | 12/2004 | Evans et al. | 285/259 |

* cited by examiner

*Primary Examiner*—Michael R Mansen
*Assistant Examiner*—Michael Kreiner
(74) *Attorney, Agent, or Firm*—Perman & Green LLP

(57) ABSTRACT

An aircraft structural element having a cavity. The structural element has an opening in a wall of the cavity through which moisture located in the cavity can escape into the surroundings, wherein a drainage element for sealing the opening in the wall of the cavity is provided in the opening. In order that the structural element can be produced with a low expenditure on components and assembly equipment, the drainage element comprises a hollow cylinder which connects the cavity of the structural element to the surroundings, which is provided with an external thread having a predefined external diameter, and a head at one end which has a predefined diameter, wherein the external diameter of the thread is smaller than the head diameter.

13 Claims, 2 Drawing Sheets

AIRCRAFT STRUCTURAL ELEMENT PROVIDED WITH A CAVITY AND DRAINAGE ELEMENT

CROSS-REFERENCE TO RELATED APPLICATION

This application is the National Stage of International Application No. PCT/EP2006/060620, International Filing Date, 10 Mar. 2006, which designated the United States of America, and which international application was published under PCT Article 21(2) as WO Publication No. WO 2006/095018 A1 and which claims priority from German Application No. 10 2005 011 531.4, filed 10 Mar. 2005.

BACKGROUND

1. Field

The disclosed embodiments relate to an aircraft structural element having a cavity.

2. Brief Description of Related Development

In aircraft, one has the problem that as a result of the large temperature differences when on the ground and in the air, moisture condenses in the cavities of structural elements of the aircraft when the structural elements have thermal contact with the outer skin of the aircraft. In this case, a particularly large amount of moisture collects in some cavities. However, moisture is undesirable for reasons of corrosion and in addition, condensed moisture can run off in an uncontrolled manner, for example, in the form of water droplets.

In the prior art, closed drainage systems are used for drainage of the respective cavities. For example, thermoplastic drainage funnels are riveted in a wall section of the respective cavity, through which condensed moisture can drain. Although these funnels are standard parts, they have the disadvantage that a large drainage hole must be provided which results in a high mechanical loading of the affected components of the aircraft. In addition, assembly using up to six rivets is relatively laborious.

Alternatively, aluminium drainage channels are attached. Although welded-on aluminium drainage channels can be used in many applications, these are not standard parts and are more difficult to manufacture and mount. Furthermore, they have a relatively high weight.

The same applies to aluminium nipples which are likewise not standard parts and are complex to manufacture and mount. As a result, their advantages in relation to lower weight and smaller hole diameter are offset. This applies regardless of whether the nipples are riveted or pressed-in.

It would be advantageous to provide an aircraft structural element having a cavity whose manufacture requires a lower expenditure on components and assembly devices and which can avoid said disadvantages which arise in the prior art.

SUMMARY

The disclosed embodiments are based on the idea of providing a drainage element in the structural element having a cavity, which comprises a hollow cylinder having an external thread and a head on one end of the hollow cylinder, the diameter of the external thread being smaller than the diameter of the head. Thus, the drainage element can be inserted in an opening through a wall of the structural element and screwed on the opposite side via the external thread. The hollow cylinder in the wall of the structural element creates a communicating connection from the cavity through the wall to the outside through which the cavity is ventilated.

The aircraft structural element, according to the disclosed embodiments, have a cavity and an opening in a wall of the cavity through which moisture located in the cavity can escape into the surroundings, wherein a drainage element for sealing the opening in the wall of the cavity is provided in the opening, is characterised in that the drainage elements comprises: a hollow cylinder which connects the cavity to the surroundings, which is provided with an external thread having a predefined external diameter, and a head at one end which has a predefined diameter, the external diameter of the thread being smaller than the head diameter.

The disclosed embodiments therefore have the advantage, inter alia, that the drainage element makes little contribution to the weight of the structural element. It is inexpensive and therefore satisfies the requirements for a standard part. The screw connection is a standard type of fastening. The diameter of the wall bore is small which means that the wall is only subjected to small mechanical loading through the drainage connection piece. No further holes or bores, for example, for rivets for fastening the drainage element, are required. The drainage element can be used equally well for thick and for thin wall thicknesses of the structural element. Installation is easy and the drainage element can be exchanged at any time and without any difficulties.

DESCRIPTION OF DRAWINGS

Further advantages and features of the disclosed embodiments are obtained from the following description of a preferred exemplary embodiment in which reference is made to the appended drawings.

DETAILED DESCRIPTION OF THE DISCUSSED EMBODIMENT

Figure 1:
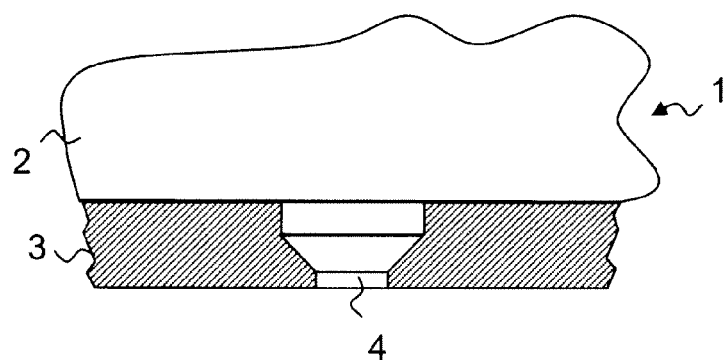
FIG. 1 is a schematic diagram showing a wall section of one embodiment of a structural element, partly in cross-section.

FIG. 1 is a schematic diagram showing a section through a structural element 1 of an aircraft. The lower region of the structural element 1 is shown. The structural element 1 is a component of the fuselage, the aircraft interior, a door or the like. This structural element 1 has a cavity 2 which is empty or contains further components (not shown) and which is terminated by a wall 3. Moisture coming in with air from outside or formed as a result of condensation can collect in this cavity and must be transported to the surroundings to avoid corrosion or formation of mould.

For this purpose, an opening 4 is provided in the wall 3 of the cavity 2 through which air can be exchanged between the cavity 2 and the surroundings and moisture can pass from the cavity 2 to the outside. The opening 4 accommodates a drainage element 5 (see FIG. 2). Water collected in the cavity can drain off through the opening 4. In order to allow optimum drainage of the water, the opening 4 is configured as funnel-shaped. In particular, the opening has an indentation on the surface of the wall 3 so that the opening 4 in the wall 3 of the cavity 2 forms a countersunk hole whose dimensions substantially correspond to those of the drainage element 5 used. The drainage element is used for sealing the opening of the hole 4 with respect to the wall 3 of the cavity in order to prevent moisture from being able to penetrate into the inner structure of the wall 3 and cause corrosion.

Figure 2:
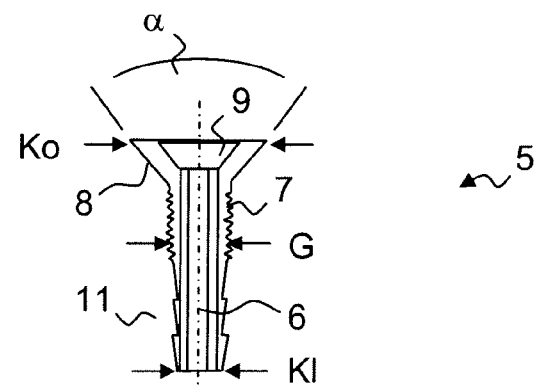
FIG. 2 is a schematic diagram of one embodiment of the drainage element of the structural of FIG. 1 in an exploded cross-section view.
Figure 2:
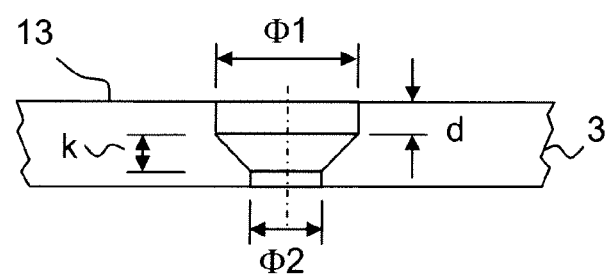
Figure 2:
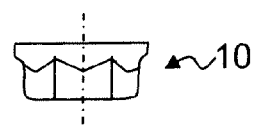

The drainage element 5 inserted in the opening 4 in the wall 3 to remove the condensed liquid is shown in FIG. 2. FIG. 2 shows an embodiment of the drainage element 5, the wall with the opening 4 and a lock-nut 10 for retaining the drainage element 5 in the opening 4. The drainage element 5 comprises a hollow cylinder 6. The hollow cylinder 6 connects the cavity of the structural element to the surroundings so that a communicating connection is formed between the cavity 2 and the surroundings.

A head 8 is provided at one end of the hollow cylinder 6, whereby the drainage element 5 is fixed to the sides of the cavity 2. The head 8 has a predefined head diameter "Ko" which is sufficiently large that the head 8 cannot slip through the opening 4 in the wall 3 of the cavity 2.

For screwing the drainage element 5 onto that side of the wall 3 located opposite to the cavity 2, the hollow cylinder 6 has an external thread 7 having a predefined external diameter "G". This external thread 7 is sufficiently long that it emerges from the opening 4 on the side of the wall 3 opposite to the cavity 2 and can be grasped by a nut 10. Thus, different embodiments of the drainage element 5 are preferably produced for different wall thicknesses.

The thread 7 has an external diameter "G" which is smaller than the diameter "Ko" of the head 8. This ensures that the drainage element 5 can easily be pushed through the opening 4 and does not come up against any obstacle.

The drainage element 5 is thus inserted through the opening 4 in the wall 3 from one side and is grasped and held by the nut 10 on the other side. In order that the drainage element 5 can be held against the torque of the nut 10 during screwing into the wall 3 during assembly, the head 8 is preferably provided with an internal profile shown in FIG. 3, which comprises a plan view of the head from above, i.e. in the direction of the external thread 7. In particular, a standardised tool such as, for example, a hexagonal key, fits into the internal profile. The internal profile then in particular has a regular hexagonal shape with an edge length "a".

Figure 3:
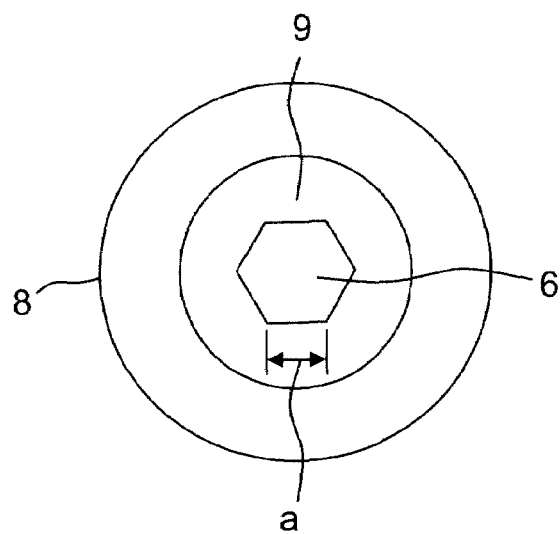
FIG. 3 is a schematic diagram of one embodiment of the drainage element of the structural element according to FIG. 1 in plan view.

As can be seen from FIG. 3, the head has an inlet funnel 9 to guide the draining condensation into the hollow cylinder 6 which has the aforesaid internal profile. In particular, the head 8 is conically shaped, the narrow end of the head 8 corresponding to the diameter "G" of the hollow cylinder 6 having the external thread 7 and the broad end corresponding to the external diameter "Ko" of the head. As a result of the conical expansion of the head, the bearing surface of the head 8 in the opening 4 is enlarged so that the sealing effect is increased and liquid is prevented from penetrating alongside the head 8 into the internal structure of the wall 3 and causing corrosion there. In addition, a seal (not shown) can be provided between the opening 4 and the drainage element 5, which serves to prevent penetration of moisture and the like.

The opening angle α of the conically expanded head 8 is in particular around 100°. That of the opening 4 in the wall 3 of the cavity 2 preferably corresponds to the opening angle α of the funnel so that the head 8 of the drainage element 5 on the sides of the cavity terminates flush with the surface 13 of the wall 3 of the cavity 2. For this purpose, the dimensions of the opening 4 in the wall 3 of the cavity 2 and the dimensions of the head 8 of the drainage element 5 are matched to one another in the structural element 1 according to the disclosed embodiments. Thus, the opening 4 has a countersunk depth "d" in the wall 3 which ensures that the head 8 terminates completely flush with the surface 13 of the wall. That is, the head height "k" of the head 8 is so small that the head 8 does not project over the surface 13. In the embodiment shown with a conically tapering head 8, the head height "k" is the distance between the head end of the hollow cylinder 6 and the free end of the head 8. In the diagram shown the surface of the head 8 thus lies below the surface 13 of the wall 3 by the amount "d".

The diameter "Φ1" of the opening 4 on the inner side of the wall 3 is sufficiently large so that the head can be completely accommodated therein. The diameter "Φ2" of the opening 4 on the outer side of the wall 3 is sufficiently large that the hollow cylinder 6 of the drainage element 5 can be pushed therethrough without any difficulties but the head 8 of the drainage element 5 does not fit through.

Figure 4:
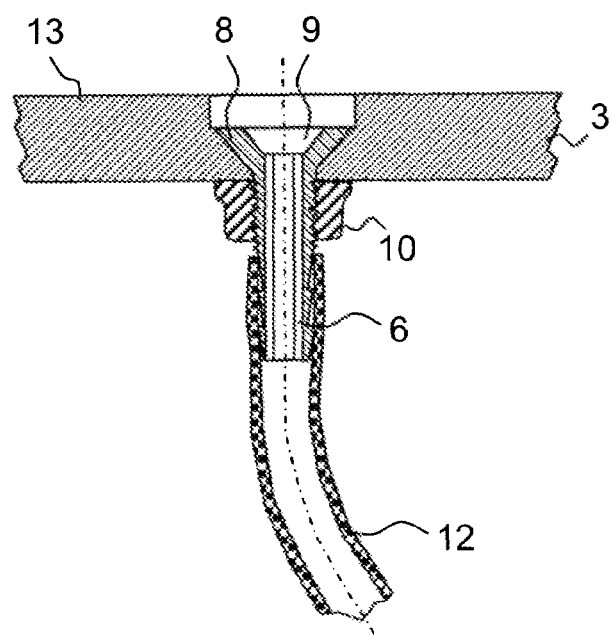
FIG. 4 is a schematic diagram of one embodiment of the drainage element of the structural element according to the FIG. 1 in the assembled state in cross-section.

In a further particularly preferred embodiment, the hollow cylinder 6 has a clamping connection section 11 at its end opposite to the head 8. In this particularly preferred embodiment, FIG. 4 shows the drainage element 5 mounted in the wall 3. The clamping connection section 11 is used to hold a hose 12 pulled onto the section 11 which is fastened to the section 11 by means of a clamping connection (not shown). The clamping connection section 11 has a predefined third clamping connection external diameter "Kl" which is smaller than the external diameter "G" of the thread 7. This ensures that the drainage element 5 can be pushed easily through the opening 4 and does not come up against any obstacle.

The drainage element 5 is in particular made of aluminium but naturally other materials are also suitable for its manufacture so that the drainage element 5 can also be fabricated as a plastic injection moulding.

REFERENCE LIST

1 Structural element
2 Cavity
3 Wall
4 Opening
5 Drainage element
6 Hollow cylinder
7 External thread
8 Head
9 Inlet funnel in head
10 Nut
11 Clamping connection section
12 Hose
13 Surface of the wall of the cavity
a Edge length of internal profile
d Countersunk depth of opening in wall
k Head height
G External diameter of thread
Ko Head diameter
Kl External diameter of clamping connection section
α Opening angle of head
Φ1 Diameter of opening on inner side of wall
Φ2 Diameter of opening on outer side of wall

The invention claimed is:

1. An aircraft structural element having a cavity with a wall, the wall including an opening through which moisture located in the cavity can escape into the surroundings external to the aircraft, and a drainage element configured to seal the opening, the drainage element comprising:
   a hollow cylinder that connects the cavity of the structural element to the surroundings;
   the hollow cylinder having an external thread having a predefined external diameter, a head at one end of the hollow cylinder that has a predefined head diameter, wherein the predefined external diameter of the external thread is smaller than the predefined head diameter; wherein the head diameter is greater than a diameter of the opening and the external thread diameter of the hollow cylinder has a diameter less than the diameter of the opening to allow the drainage element to be inserted into the opening, wherein the head is retained in an interior of the cavity and the hollow cylinder extends through the opening, the hollow cylinder having a passage connecting the cavity of the structural element to the surroundings.

2. The structural element according to claim 1, wherein the head has an internal profile that is regularly hexagonal.

3. The structural element according to claim 1, wherein the hollow cylinder is constructed with a clamping connection section, extending outward from the external threads and having a predefined clamping connection external diameter, wherein the predefined clamping connection external diameter is smaller than the predefined external diameter of the external thread.

4. The structural element according to claim 1, wherein the head is conically narrowed from the head diameter to the diameter of the hollow cylinder.

5. The structural element according to claim 4, wherein the opening angle of the conically narrowed head is about 100°.

6. The structural element according to claim 1, wherein the opening in the wall of the cavity is a countersunk hole so that the drainage element terminates flush with or below the surface of the wall of the cavity on the sides of the cavity.

7. The structural element according to claim 1, wherein the drainage element is located at a lower end of the structural element.

8. The structural element according to claim 1, wherein the drainage element is made of an aluminium alloy.

9. The structural element of claim 1 wherein the structural element is a fuselage component of an aircraft.

10. The structural element of claim 1 wherein the drainage element is fixedly secured in the opening.

11. The structural element of claim 1 wherein the drainage element is fixed to sides of the cavity.

12. The structural element of claim 1 further comprising that an end of the hollow cylinder extends from the opening on a side of the wall opposite the cavity.

13. The structural element of claim 12 further comprising that the end of the hollow cylinder extending from the opening is configured to fixedly secure the drainage element to the structural element.

* * * * *